(12) United States Patent
Bravi et al.

(10) Patent No.: US 11,900,657 B2
(45) Date of Patent: Feb. 13, 2024

(54) SYSTEM FOR AUTOMATIC STOP SIGN VIOLATION IDENTIFICATION

(71) Applicant: Verizon Connect Development Limited, Dublin (IE)

(72) Inventors: Luca Bravi, Scandicci (IT); Luca Kubin, Collecchio (IT); Leonardo Taccari, Florence (IT); Francesco Sambo, Florence (IT); Matteo Simoncini, Pistoia (IT); Douglas Coimbra De Andrade, Florence (IT); Stefano Caprasecca, Florence (IT)

(73) Assignee: Verizon Connect Development Limited, Dublin (IE)

( * ) Notice: Subject to any disclaimer, the term of this patent is extended or adjusted under 35 U.S.C. 154(b) by 440 days.

(21) Appl. No.: 17/001,161

(22) Filed: Aug. 24, 2020

(65) Prior Publication Data
US 2021/0365700 A1    Nov. 25, 2021

(30) Foreign Application Priority Data

May 21, 2020   (IT) .................. 102020000011848

(51) Int. Cl.
*G06V 20/58*    (2022.01)
*G06V 10/764*    (2022.01)
(Continued)

(52) U.S. Cl.
CPC ............. *G06V 10/764* (2022.01); *B60Q 9/00* (2013.01); *G06F 18/21* (2023.01); *G06F 18/24* (2023.01);
(Continued)

(58) Field of Classification Search
CPC ...... G06V 20/582; G06V 10/764; B60Q 9/00; G06K 9/6217; G06K 9/6267; G06N 7/005;
(Continued)

(56) References Cited

U.S. PATENT DOCUMENTS

2013/0049988 A1    2/2013 Roeber et al.
2017/0200061 A1*   7/2017 Julian .................. G07C 5/0866
(Continued)

FOREIGN PATENT DOCUMENTS

WO    2019/206252    10/2019

OTHER PUBLICATIONS

Taccari, Leonardo, et al. "Classification of crash and near-crash events from dashcam videos and telematics." 2018 21st International Conference on Intelligent Transportation Systems (ITSC). IEEE, 2018. (Year: 2018).*
(Continued)

*Primary Examiner* — Amandeep Saini
*Assistant Examiner* — Denise G Alfonso

(57) ABSTRACT

A violation detection platform may obtain image data, location data, and sensor data associated with a vehicle. The violation detection platform may determine a probability that a frame of the image data includes an image of a stop sign. The violation detection platform may determine that the probability satisfies a probability threshold. The violation detection platform may identify location data and sensor data associated with the frame of the image data based on the probability satisfying the probability threshold. The violation detection platform may determine an occurrence of a type of a stop sign violation based on the probability, the location data, and the sensor data. The violation detection platform may perform one or more actions based on determining the occurrence of the type of the stop sign violation.

20 Claims, 12 Drawing Sheets

(51) Int. Cl.

| | |
|---|---|
| *G06T 7/70* | (2017.01) |
| *G06N 20/00* | (2019.01) |
| *B60Q 9/00* | (2006.01) |
| *G08G 1/052* | (2006.01) |
| *G06F 18/21* | (2023.01) |
| *G06F 18/24* | (2023.01) |
| *G06N 7/01* | (2023.01) |
| *B60R 11/04* | (2006.01) |
| *G05D 1/00* | (2006.01) |

(52) U.S. Cl.
CPC ............... *G06N 7/01* (2023.01); *G06N 20/00* (2019.01); *G06T 7/70* (2017.01); *G06V 20/582* (2022.01); *G08G 1/052* (2013.01); *B60R 11/04* (2013.01); *G05D 1/0061* (2013.01); *G06T 2207/20084* (2013.01); *G06T 2207/30252* (2013.01)

(58) Field of Classification Search
CPC . G06N 20/00; G06T 7/70; G06T 2207/20084; G06T 2207/30252; G08G 1/052; G08G 1/0112; G08G 1/0129; G08G 1/0133; G08G 1/0145; G08G 1/017; G08G 1/096716; G08G 1/096725; G08G 1/096741; G08G 1/096775; B60R 11/04; G05D 1/0061
See application file for complete search history.

(56) References Cited

U.S. PATENT DOCUMENTS

2020/0074326 A1* 3/2020 Balakrishnan .......... G06F 16/56
2021/0306243 A1* 9/2021 Mori ....................... G01S 19/48

OTHER PUBLICATIONS

Du, Jie, and Matthew J. Barth. "Next-generation automated vehicle location systems: Positioning at the lane level." IEEE Transactions on Intelligent Transportation Systems 9.1 (2008): 48-57. (Year: 2008).*

Sutherland, Fritz. Driver traffic violation detection and driver risk calculation through real-time image processing. Diss. University of Pretoria, 2017. (Year: 2017).*

Sukkarieh, Salah, Eduardo Mario Nebot, and Hugh F. Durrant-Whyte. "A high integrity IMU/GPS navigation loop for autonomous land vehicle applications." IEEE transactions on robotics and automation 15.3 (1999): 572-578. (Year: 1999).*

Li, Jie, et al. "GPS fine time delay estimation based on signal separation estimation theory." 2012 IEEE 11th international conference on signal processing. vol. 1. IEEE, 2012. (Year: 2012).*

He, Kaiming et al., "Deep Residual Learning for Image Recognition," IEEE Conference on Computer Vision and Pattern Recognition (CVPR), Jun. 2016, 12 pages.

Krizhevsky, Alex et al., "ImageNet Classification with Deep Convolutional Neural Networks," Advances in Neural Information Processing Systems 25, 2012, University of Toronto, 9 pages.

Howard, Andrew G. et al., "MobileNets: Efficient Convolutional Neural Networks for Mobile Vision Applications," Apr. 2017, 9 pages.

Diba, Ali et al., "Temporal 3D ConvNets: New Architecture and Transfer Learning for Video Classification," Nov. 2017, 9 pages.

Aliane, et al., "Driver Behavior Monitoring System based on Traffic Violation", 2012 Intelligent Vehicles Symposium (IV), IEEE, Jun. 3, 2012, pp. 1096-1101, XP032452967.

Sutherland, "Driver Traffic Violation Detection and Driver Risk Calculation Through Real-Time Image Processing", Aug. 1, 2017, pp. 1-144, XP55771413, Retrieved from the internet: URL:https://repository.up.ac.za/bitstream/handle/2263/66246/Sutherland_Driver_2017.pdf?sequence=1&isAllowed=y [retrieved on Feb. 2, 2021].

* cited by examiner

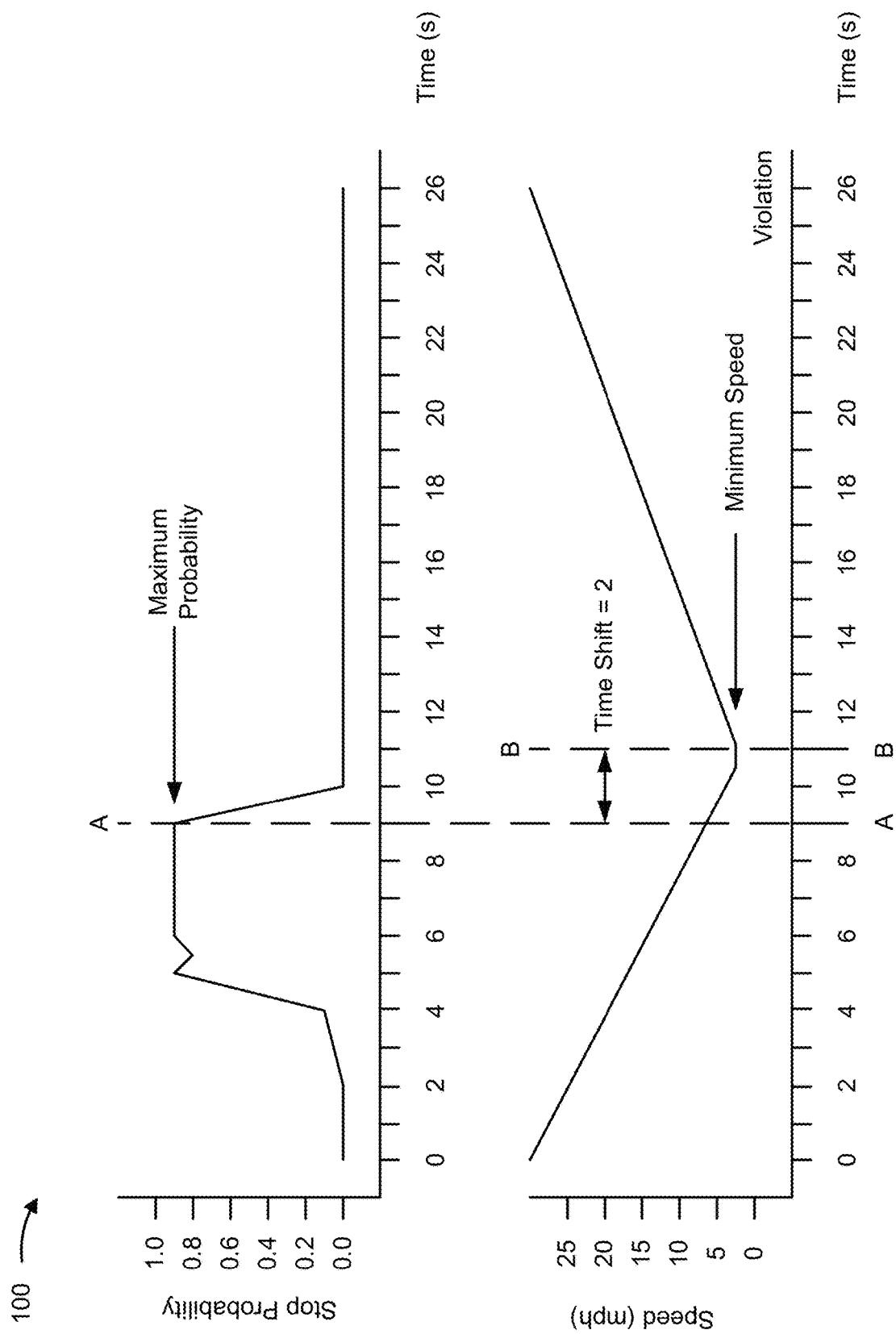

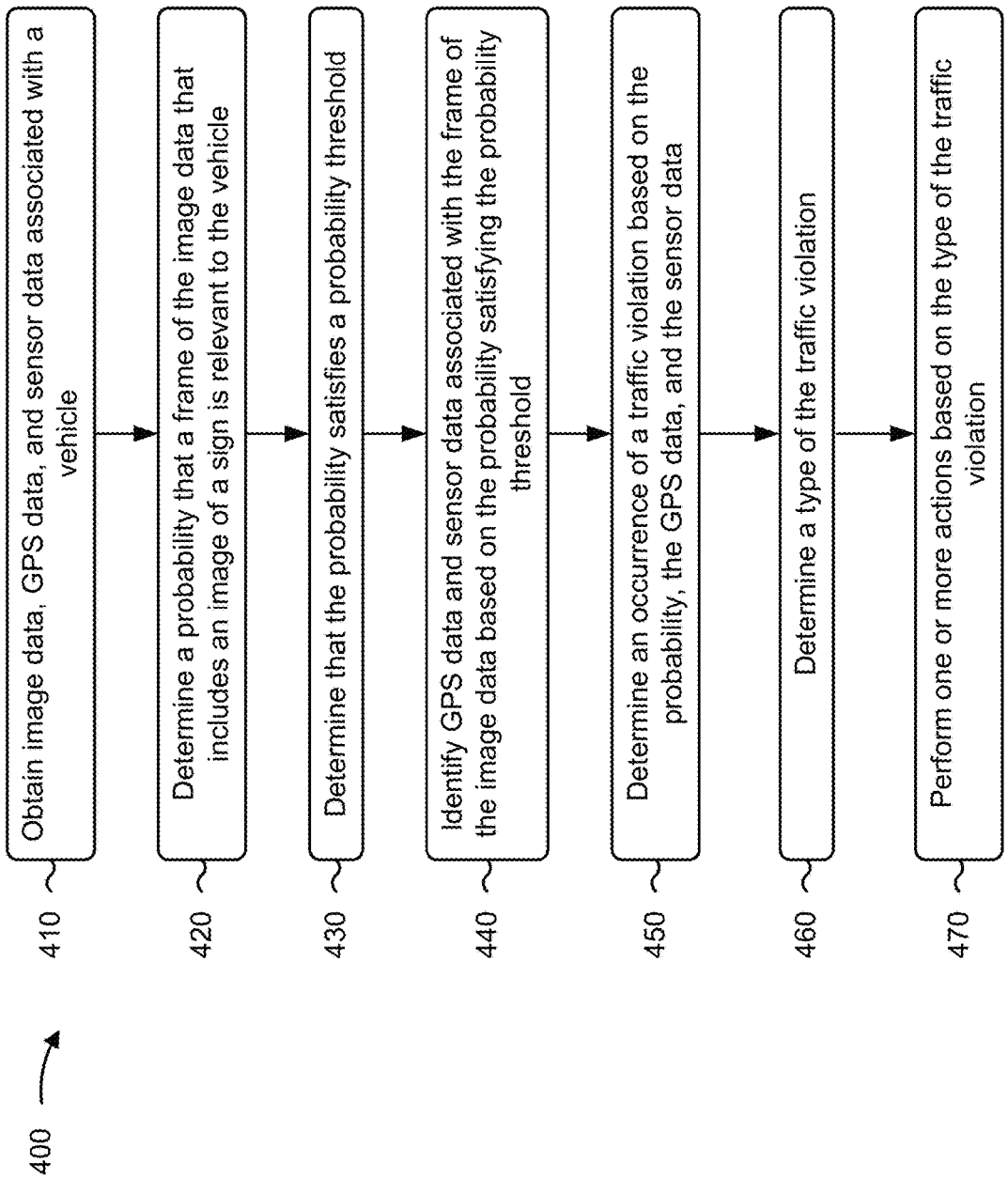

SYSTEM FOR AUTOMATIC STOP SIGN VIOLATION IDENTIFICATION

CROSS-REFERENCE TO RELATED APPLICATION

This application claims priority to Italian Application No. 102020000011848, filed on May 21, 2020, entitled "SYSTEM FOR AUTOMATIC STOP SIGN VIOLATION IDENTIFICATION," which is hereby expressly incorporated by reference herein.

BACKGROUND

Vehicles may be equipped with several devices that enable capture of sensor data, such as images or video surrounding the vehicle, engine parameters, vehicle operation parameters, and/or the like. For example, a vehicle may include a dash camera, several parking assist cameras, a backup assist camera, an on-board diagnostic (OBD) device, an electronic control unit (ECU), a global navigation satellite system (GNSS) device, and/or the like that enable capture of sensor data for different purposes.

BRIEF DESCRIPTION OF THE DRAWINGS

FIGS. 1A-1I are diagrams of one or more example implementations described herein.

FIG. 4 is a flow chart of an example process for detecting an occurrence of a stop sign violation.

DETAILED DESCRIPTION OF PREFERRED EMBODIMENTS

Figure 1A:
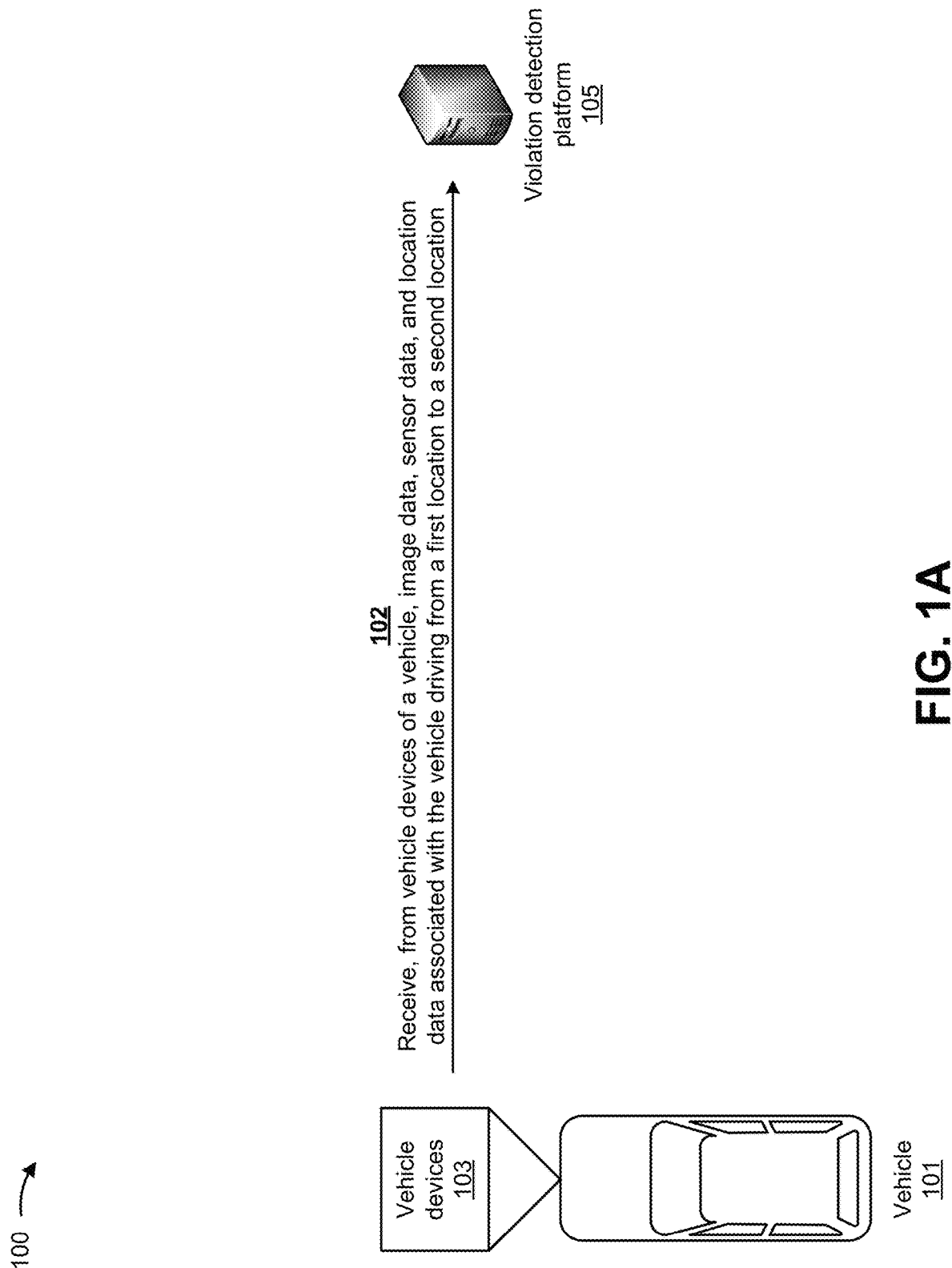

The following detailed description of example implementations refers to the accompanying drawings. The same reference numbers in different drawings may identify the same or similar elements.

An enterprise may use one or more vehicles to provide a product and/or service to customers. For example, an enterprise may use one or more vehicles to deliver packages, to provide a taxi or ride-sharing service, to transport technicians to a customer premises or to a work site, and/or the like. These vehicles may travel across hundreds or thousands of miles of roads and may travel through a multitude of intersections controlled by a stop sign.

Stop sign violations are among the main causes of road accidents. Thousands of vehicle accidents occur annually at stop signs in the United States. These accidents may result in damage to the vehicles involved in the accident and/or injury to the drivers and/or passengers of the vehicles. Damage to a vehicle and/or injury to a driver and/or a passenger of a vehicle utilized by an enterprise to provide a product and/or service may result in lost revenue for the enterprise. For example, the enterprise may have to pay to have the vehicle repaired and/or replaced, the enterprise may lose revenue by not being able to provide the product and/or service during the time it takes for the vehicle to be repaired and/or for a person to heal from an injury caused by the accident, by having to reimburse a driver of another vehicle for damage caused to the driver and/or the other vehicle, and/or the like.

To help limit stop sign violations or other moving violations, an enterprise may install a camera in each of its vehicles. The camera may capture images of a scene directly in front of the vehicle as the vehicle travels down the road. However, for enterprises utilizing a large number of vehicles, the amount of image data may be very large. In situations other than when a vehicle accident occurs, the large amount of image data may make it difficult for the enterprise to analyze the data to determine a driving behavior of a driver (e.g., whether the driver commonly commits violations) thereby making it difficult for the enterprise to take proactive actions to correct improper driving behavior prior to the bad driving behavior resulting in an accident.

According to some implementations described herein, a violation detection system automatically detects traffic violations such as stop sign violations, yield sign violations, traffic light violations, and/or the like. In some aspects, the traffic violations may be classified and labeled as various types of violations. The violation detection system may provide real-time alerts to a driver, to a fleet manager, and/or the like based on a traffic violation being classified and/or a labeled as a particular type of violation. The violation detection system may continuously analyze a driving behavior of a driver as the driver operates or drives a vehicle and/or may analyze the driving behavior of the driver in response to detecting a traffic violation, a harsh driving behavior, a reckless driving behavior, and/or the like.

In some implementations, the violation detection system may obtain image data, location data, and sensor data from a vehicle. The violation detection system may analyze the image data to detect an image of a traffic sign. The violation detection system may analyze the location data and the sensor data associated with each frame of image data containing an image of a traffic sign to automatically detect a traffic violation. The violation detection system may perform one or more actions (e.g., output a notification to a supervisor, output a notification to a driver of a vehicle, schedule driver training for a driver of a vehicle, and/or the like) based on detecting the traffic violation.

By automatically determining an occurrence of a traffic violation, the violation detection system allows training and/or another type of proactive action to be taken prior to the vehicle becoming involved in an accident. These proactive measures may reduce the number of traffic accidents caused by stop sign violations thereby reducing vehicle repairs and personal injuries resulting therefrom. In this way, automatically determining an occurrence of a stop sign violation can reduce costs associated with vehicle accidents. For example, the costs reduced can include a cost to repair a vehicle, a cost to replace a vehicle, a loss of revenue associated with the vehicle and/or a driver of the vehicle not being available for providing a good and/or service, and/or the like. Furthermore, the detection of an occurrence of a traffic violation may reduce consumption of gas and/or electricity relating to the machinery used to repair the vehicles, conserve computer resources used to diagnose vehicle repair issues, conserve computer resources used to manually detect an occurrence of a stop sign violation, and/or the like.

FIGS. 1A-1I are diagrams of one or more example implementations 100 described herein. Although FIGS. 1A-1I are described in the context of determining a stop sign violation, embodiments described herein may be used to determine other types of violations such as a stop light violation, a yield violation, a lane violation, and/or the like.

As shown in FIG. 1A, a vehicle 101 includes one or more vehicle devices 103. The vehicle devices 103 may include an image capture device (e.g., a camera, a video camera, and/or the like), a location detection device (e.g., global navigation satellite system (GNSS) device), an accelerometer, a gyroscope, and/or the like. The vehicle devices 103 may obtain data as the vehicle travels along a route and may provide the data to a violation detection platform 105.

The violation detection platform 105 may be co-located with the vehicle devices 103 (e.g., located within the same physical device, on-board the same vehicle, and/or the like) and/or remotely located with respect to the vehicle devices. For example, one or more components of the violation detection platform 105 may be on-board vehicle 101, implemented in a network device, and/or located at a central location (e.g., at a facility of an entity utilizing a fleet of vehicles).

Additionally, some implementations described herein may utilize a multi-access edge computing (MEC) environment. In a MEC environment, computing is enabled by a network architecture that provides computing capabilities to a connected device (e.g., vehicle devices such as a dashcam, a GPS, and/or the like) via computing platforms at or near an edge of a network (e.g., a wireless communication network).

Accordingly, because a MEC environment may provide computing at or near the edge of the network, increased performance may be achieved over networks in which computing is performed topologically and/or physically further from a connected device. For example, the MEC environment may offer improved performance due to less traffic and/or congestion between the connected device and the computing node(s), less latency (due to closer proximity to the connected device), increased flexibility (due to a greater amount of computing node(s)), and/or the like.

As shown in FIG. 1A, and by reference number 102, the violation detection platform 105 receives the data from the vehicle devices 103. The data may include location data (e.g., a longitude, a latitude, a heading direction, and/or the like obtained by the location detection device) associated with the vehicle traveling along a route (e.g., from a first location to a second location), image data (e.g., data obtained by the image capture device), and/or sensor data (e.g., data obtained by the accelerometer and/or the gyroscope).

The location data may include a series of location data points (e.g., GPS data points) obtained as the vehicle travels along the route. Each location data point may include information identifying a location of the vehicle 101. In some implementations, each location data point includes information identifying a time associated with the location data point (e.g., a time at which the vehicle 101 was at the location identified by the location data point). Alternatively, and/or additionally, the location data may include information identifying a sample rate at which the location data was obtained (e.g., 0.5 Hz, 1 Hz, and/or the like). The location data may be associated with a delay. For example, the location detection device may include a GPS device that receives satellite signals from one or more satellites and may calculate the location of the vehicle based on the satellite signals. The GPS device may determine a time associated with the location of the vehicle based on a time the satellite was received and/or an amount of time required for the satellite signal to propagate from the satellite to the GPS device. However, multipath propagation (e.g., buildings reflecting the satellite signals) may increase the amount of time required for the satellite signal to propagate from the satellite to the GPS device thereby adding errors (e.g., a delay) to the timing calculations.

The sensor data may include a series of sensor data points. Each sensor data point may include data obtained by one or more sensors associated with the vehicle 101. For example, a sensor data point may include data obtained by an accelerometer, data obtained by a gyroscope, and/or the like. The data obtained by the accelerometer may include information identifying an acceleration of the vehicle 101. The data obtained by the gyroscope may obtain information identifying an angular velocity of the vehicle 101.

The image data may include a plurality of frames corresponding to images of a scene in front of the vehicle 101 as the vehicle 101 travels along the route. The violation detection platform 105 may analyze the plurality of frames to determine a series of probabilities. In some implementations, the violation detection platform 105 may determine the series of probabilities that a stop sign appears or is detected within an image of the plurality of frames. Alternatively, and/or additionally, the violation detection platform 105 may determine the series of probabilities that a frame that includes an image of a stop sign is relevant to the vehicle 101. In one embodiment, relevancy comprises a probability that the stop sign is positioned to control traffic traveling in a lane that the vehicle 101 is driving in.

Each probability may be a number ranging from 0 (e.g., 0% probability that a stop sign appears in the images, for example) to 1.0 (e.g., 100% probability that a stop sign appears). An order of the probabilities within the series of probabilities may correspond to an order of the plurality of frames within the image data (e.g., a probability of a first frame of the image data corresponds to a first probability in the series of probabilities).

In some implementations, the violation detection platform 105 compresses and/or resizes the image data and determines the series of probabilities based on the compressed and/or resized image data. For example, the image data may have a frame size of 1280×720. The violation detection platform 105 may process the image data to reduce the frame size (e.g., decrease the frame size to 600×800, 320×180, and/or the like). The violation detection platform 105 may determine the series of probabilities based on the processed image data.

Alternatively, and/or additionally, the violation detection platform 105 subsamples the image data and determines the series of probabilities based on the subsampled image data. For example, the image data may be samples at a rate of 30 fps. The violation detection platform 105 may process the image data to reduce the frame rate by sampling the image data at a lower rate (e.g., decrease the frame rate to 2 fps, 1 fps, and/or the like) and may determine the series of probabilities based on the processed image data.

Determining the series of probabilities based on the compressed, resized, and/or resampled image data may have a minimal effect on how accurately the series of probabilities are determined and/or may conserve computing resources (e.g., processor resources, communication resources, memory resources, and/or the like) relative to determining the series of probabilities on the original image data. For example, by sampling the image data at a lower rate, the violation detection platform 105 may reduce a computational cost associated with detecting a traffic violation relative to a computational cost associated with utilizing image data sampled at a higher rate.

Figure 1B:
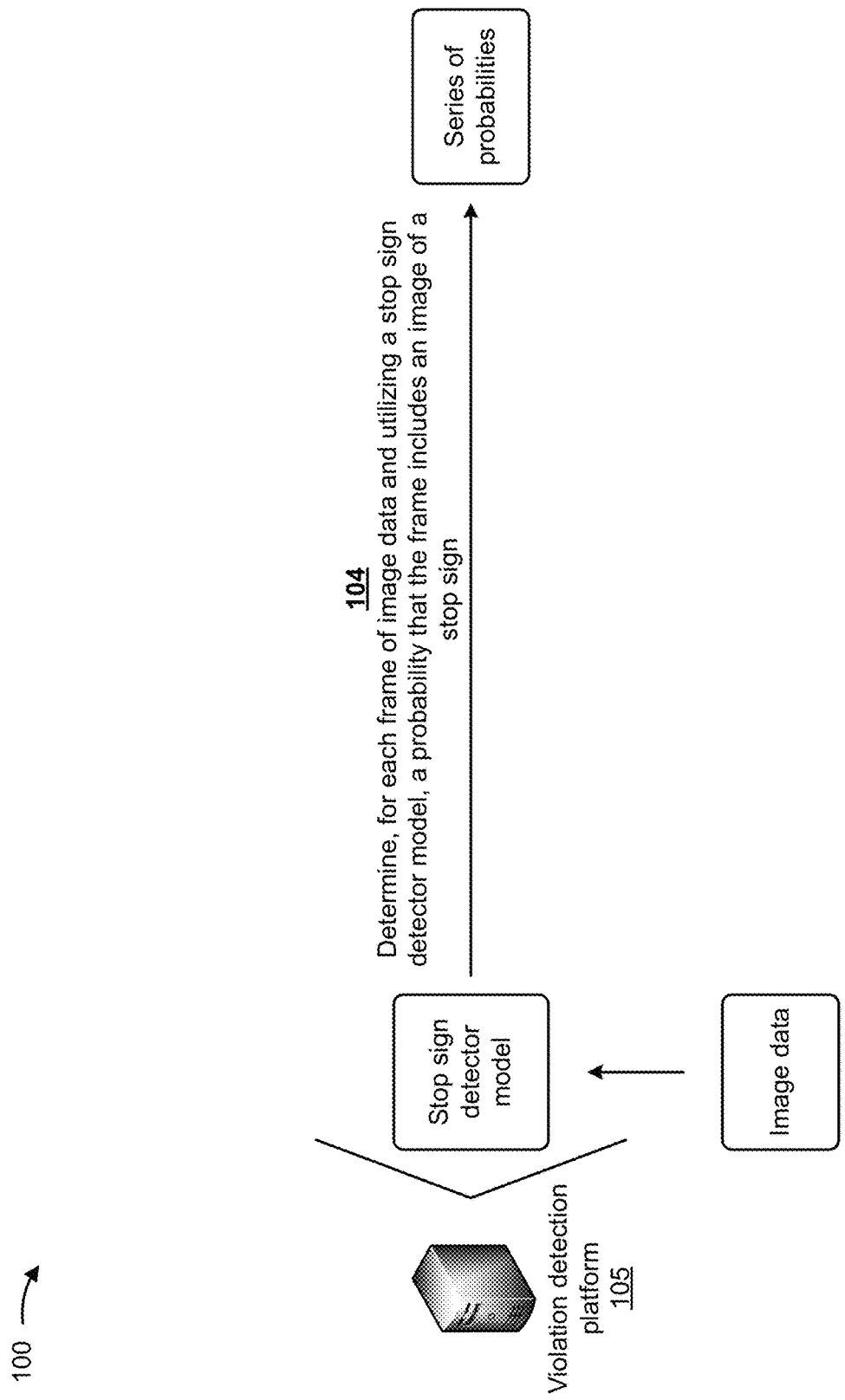

In some implementations, as shown in FIG. 1B, and by reference number 104, the violation detection platform 105 may utilize machine learning to determine the series of probabilities. For example, the violation detection platform 105 may include a machine learning system for generating, training and/or utilizing a machine learning model for determining the series of probabilities. In some implementations, the machine learning model may include a convolutional neural network that applies multiple layers of bi-dimensional convolutional filters, learned during a training process, to an input frame of image data (e.g., ResNet18, ResNet50, MobileNet, and/or the like).

In some implementations, a machine learning model may be trained using a set of observations. The set of observations may be obtained and/or input from historical data, such as data gathered from the vehicle devices 103.

A feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on image data received from the vehicle devices 103. For example, the violation detection platform 105 may frames of the image data into the machine learning system.

The machine learning system may identify a feature set (e.g., one or more features and/or corresponding feature values) from the image data. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

The set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. For example, the set of observations may include information indicating whether the observation (e.g., a frame) includes an image of a stop sign. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

In some implementations, the machine learning model may be trained on a set of observations obtained from image capture devices having the same intrinsic parameters (e.g., focal length, skew, and/or the like). In some implementations, the set of observations be obtained from a plurality of image capture devices and the observations obtained from each image capture device may include at least one observation that includes an image of a stop sign and at least one observation that does not include an image of a stop sign. In this way, the training of the machine learning model may not be affected by a difference in lighting conditions, camera mounting positions, and/or the like between different observations.

The machine learning system may partition the set of observations into a training set that includes a first subset of observations, of the set of observations, and a test set that includes a second subset of observations of the set of observations. The training set may be used to train (e.g., fit, tune, and/or the like) the machine learning model, while the test set may be used to evaluate a machine learning model that is trained using the training set. For example, for supervised learning, the training set may be used for initial model training using the first subset of observations, and the test set may be used to test whether the trained model accurately predicts target variables in the second subset of observations. In some implementations, the machine learning system may partition the set of observations into the training set and the test set by including a first portion or a first percentage of the set of observations in the training set (e.g., 75%, 80%, or 85%, among other examples) and including a second portion or a second percentage of the set of observations in the test set (e.g., 25%, 20%, or 15%, among other examples). In some implementations, the machine learning system may randomly select observations to be included in the training set and/or the test set.

The machine learning system may train a machine learning model using the training set. This training may include executing, by the machine learning system, a machine learning algorithm to determine a set of model parameters based on the training set. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set). For example, for a regression algorithm, a model parameter may include a regression coefficient (e.g., a weight). For a decision tree algorithm, a model parameter may include a decision tree split location, as an example.

The machine learning system may use one or more hyperparameter sets to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set. The machine learning system may tune each machine learning algorithm using one or more hyperparameter sets (e.g., based on operator input that identifies hyperparameter sets to be used, based on randomly generating hyperparameter values, and/or the like). The machine learning system may train a particular machine learning model using a specific machine learning algorithm and a corresponding hyperparameter set. In some implementations, the machine learning system may train multiple machine learning models to generate a set of model parameters for each machine learning model, where each machine learning model corresponds to a different combination of a machine learning algorithm and a hyperparameter set for that machine learning algorithm.

In some implementations, the machine learning system may perform cross-validation when training a machine learning model. Cross validation can be used to obtain a reliable estimate of machine learning model performance using only the training set, and without using the test set, such as by splitting the training set into a number of groups (e.g., based on operator input that identifies the number of groups, based on randomly selecting a number of groups, and/or the like) and using those groups to estimate model performance. For example, using k-fold cross-validation, observations in the training set may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set associated with a particular machine learning algorithm. The machine learning system may compare the overall cross-validation scores for different hyperparameter sets associated with the particular machine learning algorithm, and may select the hyperparameter set with the best (e.g., highest accuracy, lowest error, closest to a desired threshold, and/or the like) overall cross-validation score for training the machine learning model. The machine learning system may then train the machine learning model using the selected hyperparameter set, without cross-validation (e.g., using all of data in the training set without any hold-out groups), to generate a single machine learning model for a particular machine learning algorithm. The machine learning system may then test this machine learning model using the test set to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model to be used to analyze new observations, as described below.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set (e.g., without cross-validation), and may test each machine learning model using the test set to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model.

Additionally, or alternatively, the machine learning model may employ a different machine learning algorithm, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

The trained machine learning model may be applied to a new observation. The new observation may be input to a machine learning system that stores a trained machine learning model. For example, the machine learning system may receive a new observation (or a set of new observations) and may input the new observation to the machine learning model. The machine learning system may apply the trained machine learning model to the new observation to generate an output (e.g., a result). For example, the trained machine learning model may predict a value of for the target variable of a probability that the observation includes an image of a stop sign for the new observation.

In this way, the machine learning system may apply a rigorous and automated process to determining whether a frame includes an image of a stop sign. The machine learning system enables recognition and/or identification of tens, hundreds, thousands, or millions of features and/or feature values for tens, hundreds, thousands, or millions of observations, thereby increasing an accuracy and consistency of determining whether a frame includes an image of a stop sign relative to requiring computing resources to be allocated for tens, hundreds, or thousands of operators to manually determining whether a frame includes an image of a stop sign using the features or feature values.

Figure 1C:
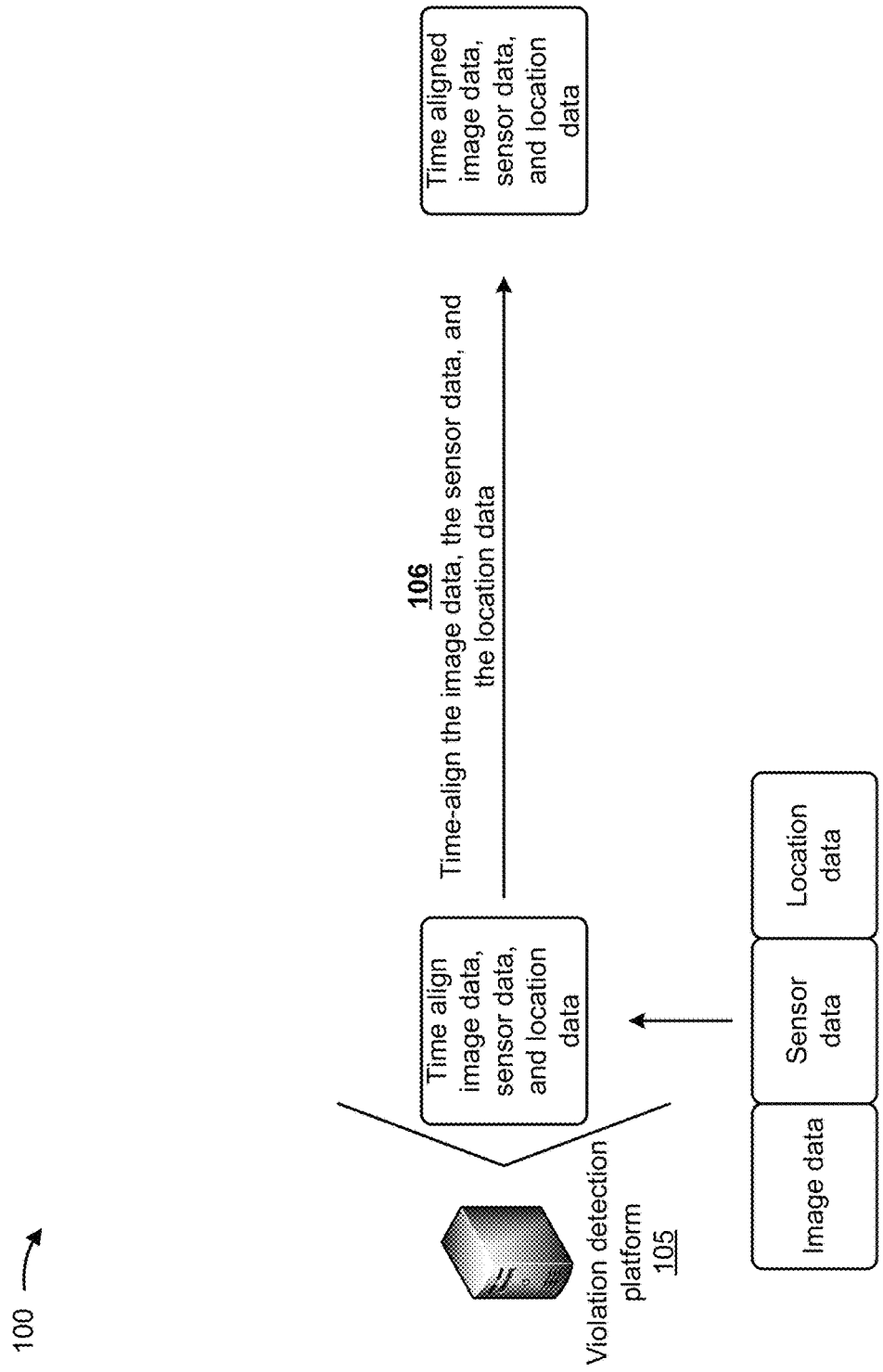

As shown in FIG. 1C, and by reference number 106, the violation detection platform 105 time-aligns the image data, the location data, and the sensor data. For example, the violation detection platform 105 may align frames of image data with location data and sensor data corresponding to a time at which the frames were captured by the image capture device. Stated differently, a frame captured at time $T_1$ will be aligned with sensor data captured at $T_1$ and location data indicating a position of the vehicle 101 at $T_1$. In some implementations, the violation detection platform 105 aligns each frame of image data with location data and sensor data. In some implementations, the violation detection platform 105 aligns one or more portions of frames of image data. For example, the violation detection platform 105 may align each frame of image data associated with a probability of the frame including an image of a stop sign that satisfies a threshold probability (e.g., 0.7, 0.75, 0.8, and/or the like); a group of consecutive frames associated with a probability of the frame including an image of a stop that satisfies the threshold probability, and/or the like.

The violation detection platform 105 may time-align the image data, the location data, and the sensor data based on the delay associated with the location data. In some implementations, the violation detection platform 105 determines the delay based on a speed of the vehicle 101. For example, the violation detection platform 105 may determine a speed of the vehicle 101 based on the location data. As discussed above, the location data may include a series of location data points. The violation detection platform 105 may calculate a distance travelled between locations associated with consecutive location data points based on the information identifying the location of the vehicle 101 included in the consecutive location data points. The violation detection platform 105 may determine an amount of time for the vehicle 101 to travel between the locations identified by the consecutive location data points based on the information identifying the time at which the vehicle 101 was at the location included in the consecutive location data points. The violation detection platform 105 may determine a speed of the vehicle 101 as the vehicle 101 travelled between locations identified by the consecutive location data points by dividing the distance travelled by the amount of time. The violation detection platform 105 may determine a time shift (e.g., a delay) that, when applied to the location data, results in a maximum correlation between the speeds determined by the violation detection platform 105 and acceleration data included in the sensor data.

In some implementations, the violation detection platform 105 determines the delay based on frequency information determined by computing a Fourier transform of the speeds determined based on the location data and the acceleration data.

In some implementations the violation detection platform 105 determines the delay based on an acceleration of the vehicle 101. For example, the violation detection platform 105 may determine an acceleration of the vehicle 101 between locations identified by consecutive location data points based on the speed of the vehicle 101 between the locations identified by consecutive location data points divided by the amount of time for the vehicle 101 to travel between the locations associated with consecutive location data points. The violation detection platform 105 may determine a time shift that, when applied to the location data, results in a maximum correlation between the accelerations determined by the violation detection platform 105 and the acceleration data.

In some implementations, the violation detection platform 105 processes the sensor data to remove high-frequency noise from the sensor data and/or the acceleration data prior to determining the maximum correlation. For example, the violation detection platform 105 may cause the sensor data and/or the acceleration data to pass through a low pass Butterworth filter to remove the high-frequency noise.

In some implementations, the violation detection platform 105 time-aligns the image data, the location data, and the sensor data at the same sample rate. For example, the sensor data may include data sampled at a first sample rate (e.g., 100 Hz). The image data may be sampled at a second sample rate (e.g., 2 Hz). The location data may be sampled at a third sample rate (e.g., 1 Hz). The violation detection platform 105 may time-align the image data, the location data, and the sensor data at the same sample rate (e.g., 1 Hz, 2 Hz, and/or the like).

For example, the violation detection platform may time-align the image data, the location data, and the sensor data at the sample rate of the image data (e.g., 2 Hz). The violation detection platform 105 may up-sample the location data based on computing a linear interpolation of the location data to increase the sample rate of the location data to 2 Hz. The violation detection platform 105 may down-sample the sensor data to reduce the sample rate of the sensor data to 2 Hz.

Figure 1D:
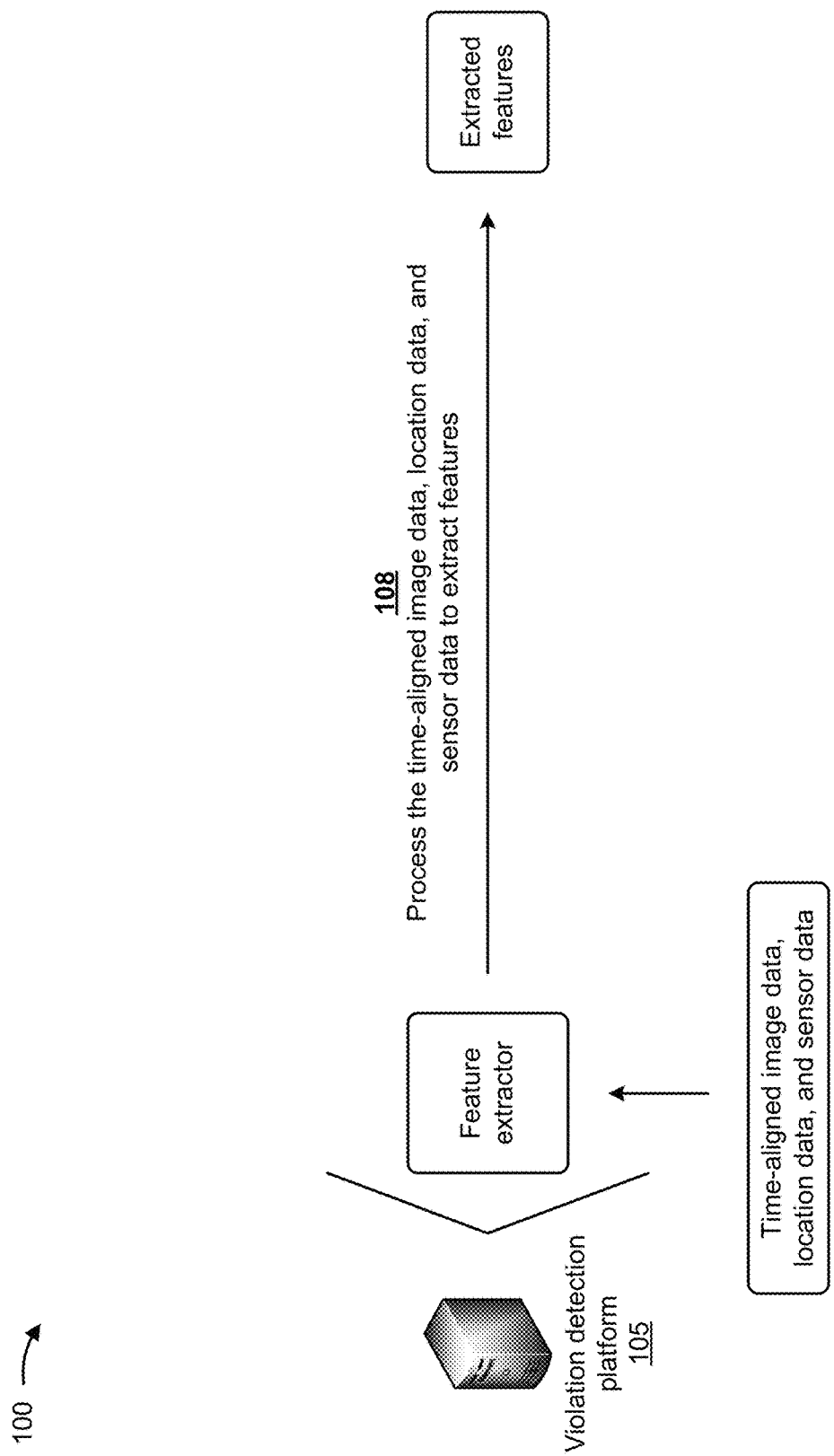

As shown in FIG. 1D, and by reference number 108, the violation detection platform 105 may determine an occurrence of a stop sign violation based on the time-aligned image data, location data, and sensor data. The violation detection platform 105 may process the time-aligned image data, location data, and sensor data to determine one or more features describing correlations between the series of probabilities, the location data, and the sensor data.

The violation detection platform 105 may analyze the image data and/or the series of probabilities to determine one or more image features. These image features may include a maximum probability included in the series of probabilities, a minimum probability included in the series of probabilities, a mean probability associated with the series of probabilities, a median probability associated with the series of probabilities, a standard deviation associated with the series of probabilities, a frame number associated with a frame associated with the maximum probability, a frame number associated with a last frame associated with a probability that satisfies a threshold probability (e.g., 0.7, 0.75. 0.8), and/or the like. To filter out frames including images of a stop sign in a lane other than the lane the vehicle is traveling in, the violation detection platform 105 may determine the one or more image features based on the entire frame, based on a first half of the frame (e.g., a left half), and based on a second half of the frame (e.g., a right half).

In some implementations, the maximum probability is determined by identifying the longest sequence of consecutive frames associated with a probability greater than the threshold probability and determining the maximum probability associated with a frame included in the longest sequence of consecutive frames.

The violation detection platform 105 may process the sensor data to determine one or more sensor features. For example, the sensor data may include accelerometer data. The violation detection platform 105 may process the accelerometer data to determine one or more accelerometer features associated with all of the accelerometer data and/or a portion of the accelerometer data such as a maximum acceleration, a minimum acceleration (e.g., a maximum deceleration), a mean acceleration, a median acceleration, a standard of deviation associated with the accelerometer data, instants of maximum acceleration, instants of minimum acceleration, and/or the like.

Alternatively, and/or additionally, the sensor data may include gyroscope data. The violation detection platform 105 may process the gyroscope data to determine one or more gyroscope features associated with all of the gyroscope data and/or a portion of the gyroscope data such as a maximum angular velocity, a minimum angular velocity, a mean angular velocity, a median angular velocity, a standard of deviation associated with the gyroscope data, instants of maximum angular velocity, instants of minimum angular velocity, and/or the like.

The violation detection platform 105 may process the location data and/or the speeds determined based on the location data to determine one or more location features such as a maximum speed, a minimum speed, a mean speed, a median speed, a standard deviation associated with the determined speeds, a shape of a speed profile, and/or the like. The shape of the speed profile may be determined based on second order polynomial parameters extracted by interpolating the speed values of 2.5 second windows, for example, centered on the instant of the maximum probability.

The portion of the accelerometer data, the portion of the gyroscope data, and/or the portion of the location data may be associated with a time window starting two seconds ahead of a time associated with a frame of the image data associated with a maximum probability and ending five seconds later.

The violation detection platform 105 may determine one or more correlation features describing a correlation between the image data, the location data, and the sensor data such as a maximum cross correlation value between the speeds determined based on the location data and the series of probabilities, an instant of the maximum correlation value, a time-shift between speed and stop probabilities to obtain the maximum correlation value, a time shift between a minimum acceleration and a maximum probability, and/or the like.

Figure 1E:
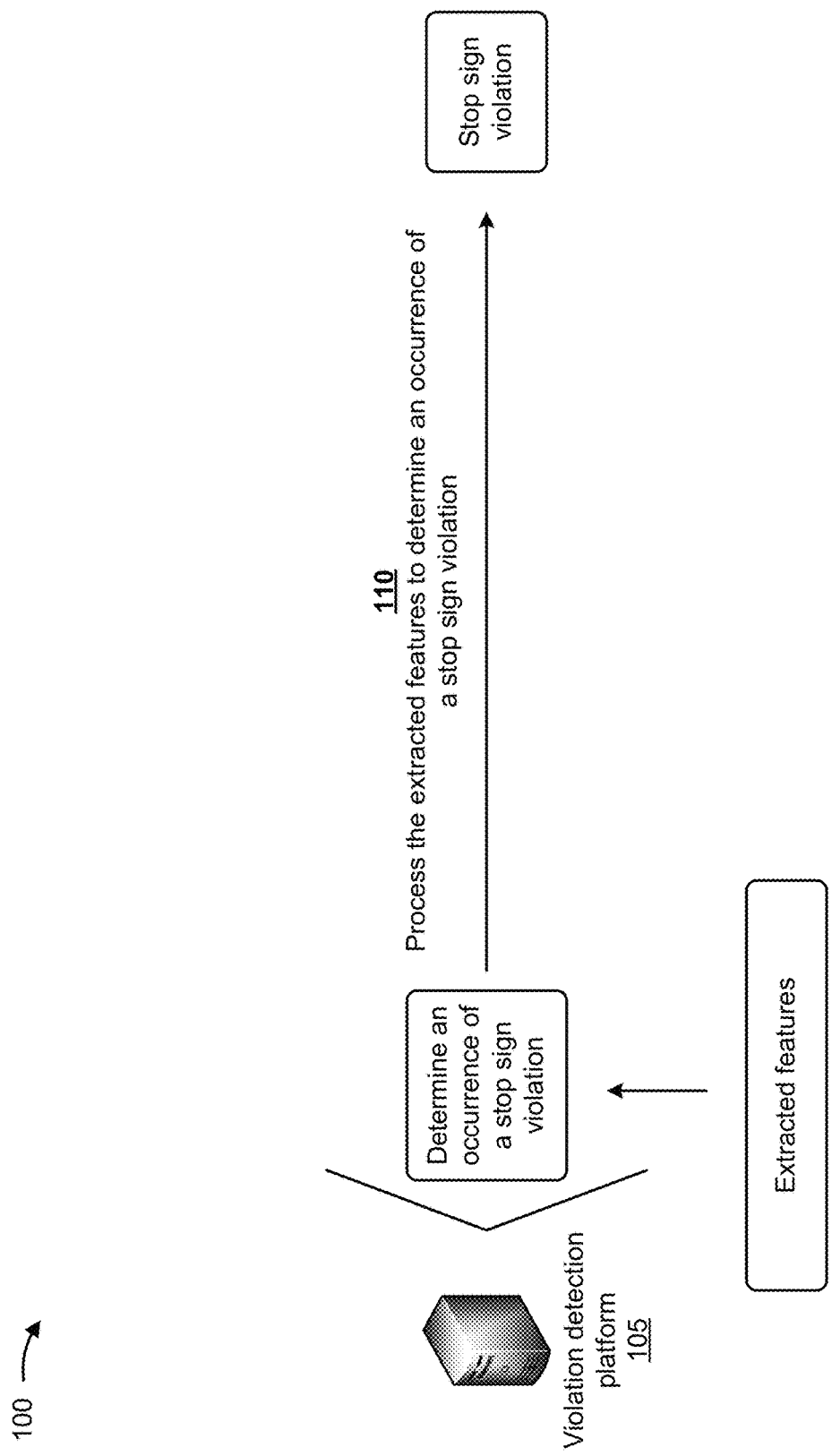

As shown in FIG. 1E, and by reference number 110, the violation detection platform 105 processes the extracted features to determine an occurrence of a stop sign violation. For example, the violation detection platform may generate a graph based on the image features, the sensor features (e.g., the accelerometer features, the gyroscope features, and/or the like), the location features, and the correlation features. The violation detection platform 105 may determine an occurrence of a stop sign violation based on the graph, as further described with respect to FIGS. 1F-1H.

In some implementations, the violation detection platform 105 uses a machine learning model, such as, for example, a random forest regressor model, to determine whether a stop sign violation occurred. For example, the violation detection platform 105 may train the machine learning model based on one or more parameters, such as image data features, location data features, sensor data features, correlation features, and/or the like. The violation detection platform 105 may train the machine learning model, according to the one or more parameters, using historical data associated with determining whether a stop sign violation occurred. Using the one or more parameters as inputs to the machine learning model, the violation detection platform 105 may determine whether a stop sign violation occurred.

Figure 1F:
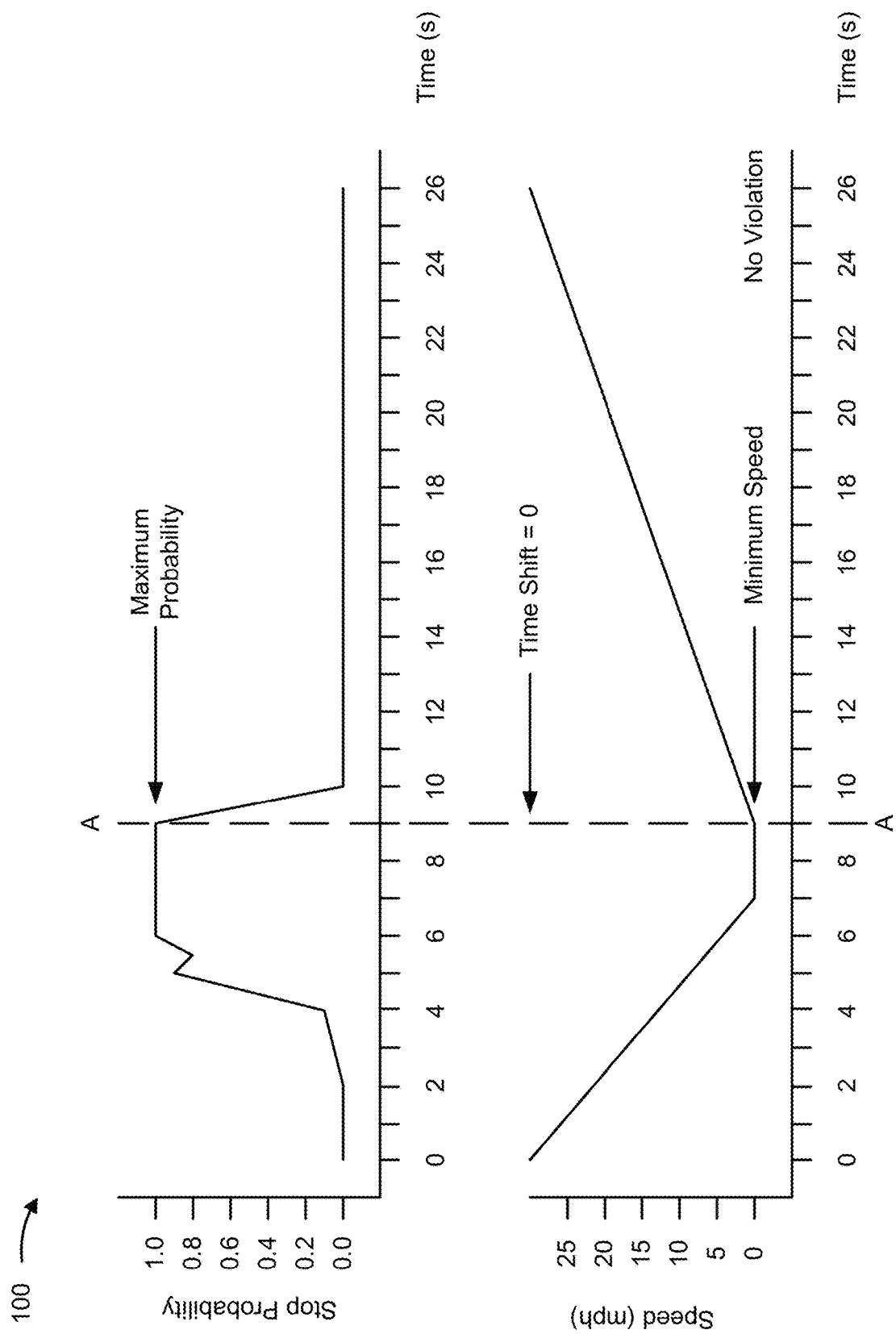

FIG. 1F illustrates an example in which a correspondence between a graph of the series of probabilities with respect to time and a graph of a vehicle speed with respect to time indicates that a stop sign violation did not occur. As shown in FIG. 1F, the upper graph shows the probability that a stop is present in a frame of image data as a function of time. As shown in FIG. 1F, the probability increases to a maximum probability (e.g., 1.0 as shown in FIG. 1F), remains relatively constant for a period of time (e.g., from 6.0 seconds to 9.0 seconds as shown in FIG. 1F), and then decreases. The violation detection platform 105 may determine that the vehicle 101 enters an intersection controlled by a stop sign at a time corresponding to a point on the graph at which the probability transitions from remaining relatively constant at the maximum probability to decreasing in value (shown in FIG. 1F as the point at which the dashed line A-A intersects the graph of the series of probabilities).

The lower plot shows the speed profile determined based on the location data as a function of time. As shown in FIG. 1F, the speed decreases to a minimum speed (e.g., 0 mph as shown in FIG. 1F), remains relatively constant for a period of time (e.g., from 7.0 seconds to 9.0 seconds as shown in FIG. 1F), and then increases. The violation detection platform 105 may determine a point on the lower graph at which the minimum speed transitions from remaining relatively constant at the minimum speed to increasing in value (shown in FIG. 1F as the point at which the dashed line A-A intersects the graph of the speed profile).

The violation detection platform 105 may determine whether a stop sign violation occurred by based on a correlation between the point on the upper graph at which the probability transitions from remaining relatively constant at the maximum probability to decreasing in value and the point at on the lower graph at which the minimum speed transitions from remaining relatively constant at the minimum speed to increasing in value. For example, the violation detection platform 105 may determine a time shift (e.g., a difference in time) associated with the point on the upper graph at which the probability transitions from remaining relatively constant at the maximum probability to decreasing in value and the point on the lower graph at which the minimum speed transitions from remaining relatively constant at the minimum speed to increasing in value.

The violation detection platform 105 may determine that the point on the upper graph at which the probability transitions from remaining relatively constant at the maximum probability to decreasing in value occurs at a time of 9.0 seconds. The violation detection platform 105 may determine that the point on the lower graph at which the minimum speed transitions from remaining relatively constant at the minimum speed to increasing in value occurs at a time of 9.0 seconds. The violation detection platform 105 may determine that the time shift is equal to zero seconds based on a difference between the two times (e.g., 9.0 seconds−9.0 seconds=0.0 seconds). The violation detection platform 105 may determine that the minimum speed at the point at on the lower graph at which the minimum speed transitions from remaining relatively constant at the minimum speed to increasing in value is zero miles per hour. The violation detection platform 105 may determine that a stop sign violation did not occur based on the time shift being equal to zero seconds and the minimum speed being equal to zero miles per hour.

FIG. 1G illustrates an example in which a correspondence between a graph of the series of probabilities with respect to time and a graph of a vehicle speed with respect to time indicates an occurrence of a first type of stop sign violation. As shown in FIG. 1G, the upper graph shows the probability that a stop is present in a frame of image data as a function of time. As shown in FIG. 1G, the probability increases to a maximum probability (e.g., 0.9 as shown in FIG. 1G), remains relatively constant for a period of time (e.g., from 6.0 seconds to 9.0 seconds as shown in FIG. 1G), and then decreases. The violation detection platform 105 may determine that the vehicle 101 enters an intersection controlled by a stop sign at a time corresponding to a point on the graph at which the probability transitions from remaining relatively constant at the maximum probability to decreasing in value (as shown in FIG. 1G, the point at which dashed line A-A intersects the graph of the series of probabilities).

The lower plot shows the speed profile determined based on the location data as a function of time. As shown in FIG. 1G, the speed decreases to a minimum speed (e.g., 5.0 mph as shown in FIG. 1G), remains relatively constant for a period of time (e.g., from 10.5 seconds to 11.0 seconds as shown in FIG. 1G), and then increases. The violation detection platform 105 may determine a point on the lower graph at which the minimum speed transitions from remaining relatively constant at the minimum speed to increasing in value (as shown in FIG. 1G, the point at which dashed line B-B intersects the graph of the speed profile).

The violation detection platform 105 may determine whether a stop sign violation occurred by based on a correlation between the point on the upper graph at which the probability transitions from remaining relatively constant at the maximum probability to decreasing in value and the point on the lower graph at which the minimum speed transitions from remaining relatively constant at the minimum speed to increasing in value. For example, the violation detection platform 105 may determine a time shift associated with the point on the upper graph at which the probability transitions from remaining relatively constant at the maximum probability to decreasing in value and the point on the lower graph at which the minimum speed transitions from remaining relatively constant at the minimum speed to increasing in value.

The violation detection platform 105 may determine that the point on the upper graph at which the probability transitions from remaining relatively constant at the maximum probability to decreasing in value occurs at a time of 9.0 seconds based on the upper graph. The violation detection platform 105 may determine that the point on the lower graph at which the minimum speed transitions from remaining relatively constant at the minimum speed to increasing in value occurs at a time of 11.0 seconds based on the lower graph. The violation detection platform 105 may determine that the time shift is equal to 2.0 seconds based on a difference between the two times (e.g., 11.0 seconds−9.0 seconds=2.0 seconds). The violation detection platform may determine that the minimum speed at the point at on the lower graph at which the minimum speed transitions from remaining relatively constant at the minimum speed to increasing in value is 2.5 miles per hour.

The violation detection platform 105 may determine an occurrence of a stop sign violation based on the time shift being equal to 2.0 seconds and/or the minimum speed being equal to 2.5 miles per hour. For example, the violation detection platform 105 may determine the occurrence of the stop sign violation based on the vehicle 101 failing to achieve a minimum speed of 0.0 prior to the vehicle 101 entering the intersection. Alternatively, and/or additionally, the violation detection platform 105 may determine the occurrence of the stop sign violation based on the time shift indicating that the vehicle 101 attained the minimum speed after the vehicle 101 entered the intersection.

The violation detection platform may determine whether the stop sign violation is a first type of stop sign violation or a second type of stop sign violation. The violation detection platform 105 may determine that the stop sign violation is the first type of stop sign violation based on the time shift and/or the minimum speed. The first type of stop sign violation may occur when the vehicle 101 fails to come to a complete stop prior to entering the intersection but the minimum speed of the vehicle 101 is below a threshold speed and the minimum speed is obtained within a threshold amount of time after the vehicle 101 enters the intersection. For example, the violation detection platform 105 may determine that the stop sign violation is the first type of stop sign violation based on the minimum speed being below a threshold speed of about 3.0 mph, 4.0 mph, 5.0 mph, and/or the like and/or based on the time shift (e.g., an amount of time that the vehicle 101 obtains the minimum speed after the vehicle 101 enters the intersection) being below a threshold time shift such as 2.5 seconds, 3 seconds, and/or the like.

Figure 1H:
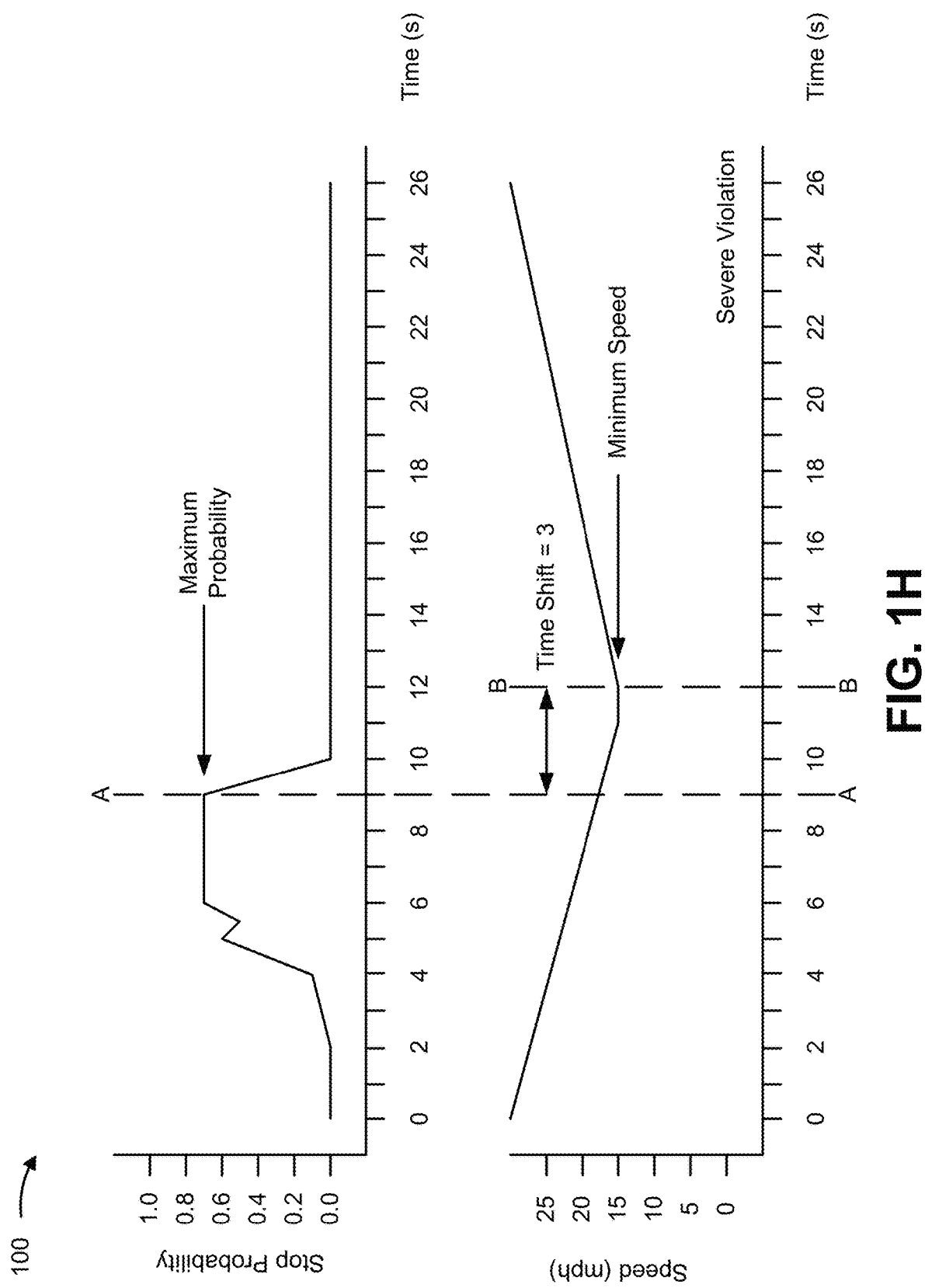

FIG. 1H illustrates an example in which a correspondence between a graph of the series of probabilities with respect to time and a graph of a vehicle speed with respect to time indicates an occurrence of the second type of stop sign violation. As shown in FIG. 1H, the upper graph shows the probability that a stop is present in a frame of image data as a function of time. As shown in FIG. 1H, the probability increases to a maximum probability (e.g., 0.7 as shown in FIG. 1H), remains relatively constant for a period of time (e.g., from 6.0 seconds to 9.0 seconds as shown in FIG. 1H), and then decreases. The violation detection platform 105 may determine that the vehicle 101 enters an intersection controlled by a stop sign at a time corresponding to a point on the graph at which the probability transitions from remaining relatively constant at the maximum probability to decreasing in value (as shown in FIG. 1H, the point at which dashed line A-A interests the graph of the series of probabilities).

The lower plot shows the speed profile determined based on the location data as a function of time. As shown in FIG. 1H, the speed decreases to a minimum speed (e.g., 15.0 mph as shown in FIG. 1H), remains relatively constant for a period of time (e.g., from 11.0 seconds to 12.0 seconds as shown in FIG. 1H), and then increases. The violation detection platform 105 may determine a point on the lower graph at which the minimum speed transitions from remaining relatively constant at the minimum speed to increasing in value (as shown in FIG. 1H, the point at which dashed line B-B intersects the graph of the speed profile).

The violation detection platform 105 may determine whether a stop sign violation occurred by based on a correlation between the point on the upper graph at which the probability transitions from remaining relatively constant at the maximum probability to decreasing in value and the point at on the lower graph at which the minimum speed transitions from remaining relatively constant at the minimum speed to increasing in value. For example, the violation detection platform 105 may determine a time shift associated with the point on the upper graph at which the probability transitions from remaining relatively constant at the maximum probability to decreasing in value and the point at on the lower graph at which the minimum speed transitions from remaining relatively constant at the minimum speed to increasing in value.

The violation detection platform 105 may determine that the point on the upper graph at which the probability transitions from remaining relatively constant at the maximum probability to decreasing in value occurs at a time of 9.0 seconds. The violation detection platform 105 may determine that the point on the lower graph at which the minimum speed transitions from remaining relatively constant at the minimum speed to increasing in value occurs at a time of 12.0 seconds. The violation detection platform 105 may determine that the time shift is equal to 3.0 seconds based on a difference between the two times (e.g., 12.0 seconds−9.0 seconds=3.0 seconds). The violation detection platform 105 may determine that the minimum speed at the point on the lower graph at which the minimum speed transitions from remaining relatively constant to increasing in value is 15.0 miles per hour.

The violation detection platform 105 may determine an occurrence of a stop sign violation based on the time shift being equal to 3.0 seconds and/or the minimum speed being equal to 15.0 miles per hour. For example, the violation detection platform 105 may determine the occurrence of the stop sign violation based on the vehicle 101 failing to achieve a minimum speed of 0.0 prior to the vehicle 101 entering the intersection. Alternatively, and/or additionally, the violation detection platform 105 may determine the occurrence of the stop sign violation based on the time shift indicating that the vehicle 101 attained the minimum speed after the vehicle 101 entered the intersection.

The violation detection platform 105 may determine that the stop sign violation is the second type of stop sign violation based on the time shift and/or the minimum speed. The second type of stop sign violation may occur when the vehicle 101 fails to come to a complete stop prior to entering the intersection and the minimum speed of the vehicle 101 is greater than a threshold speed. For example, the violation detection platform 105 may determine that the stop sign violation is the second type of stop sign violation based on the minimum speed being greater than a specified threshold speed. The specified threshold speed may be about 3.0 mph, 4.0 mph, 5.0 mph, and/or the like and/or based on the time shift (e.g., an amount of time that the vehicle 101 obtains the minimum speed after the vehicle 101 enters the intersection) being greater than a threshold time shift such as 2.5 seconds, 3 seconds, and/or the like.

Figure 1I:
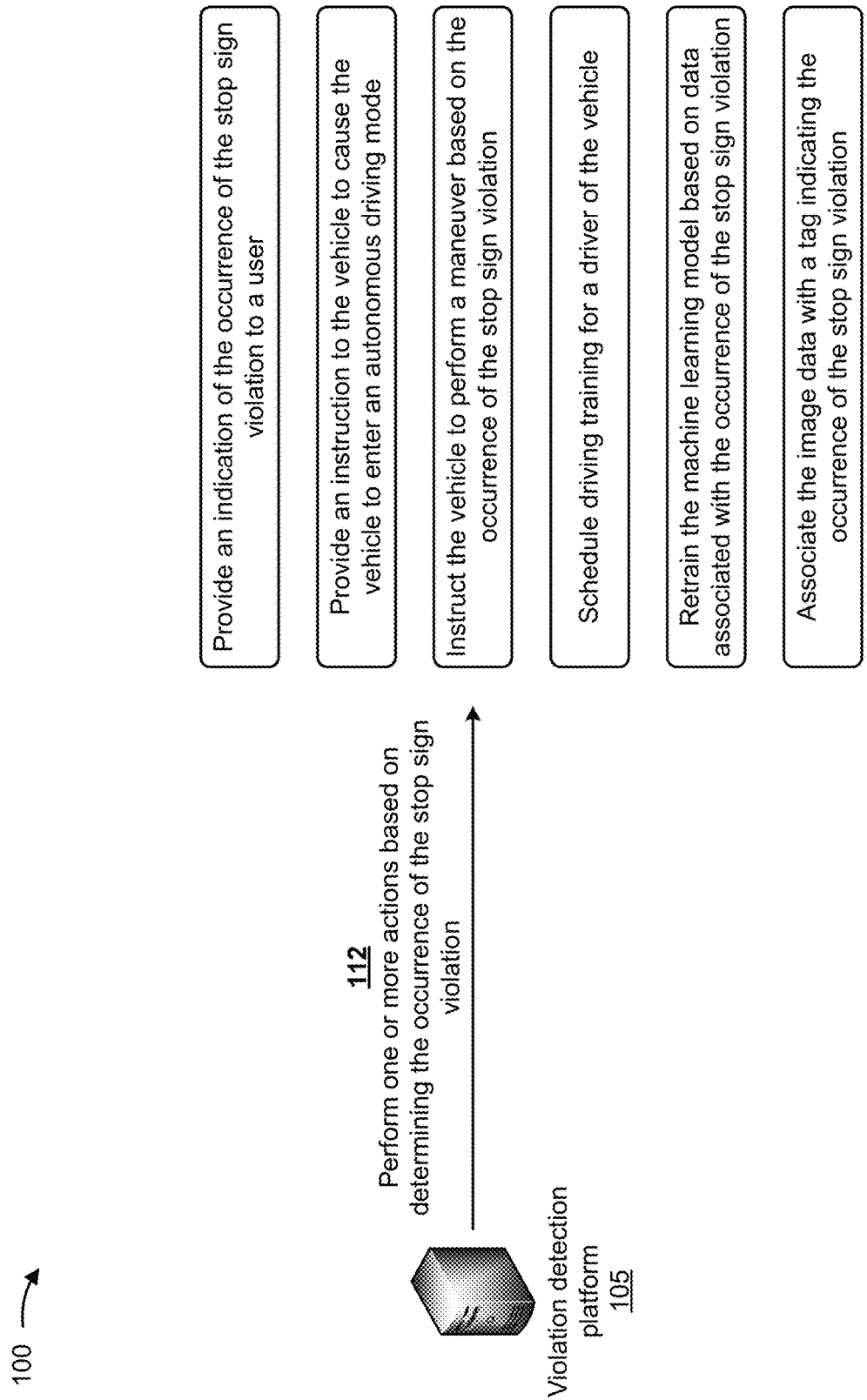

As shown in FIG. 1I, and by reference number 112, the violation detection platform 105 performs one or more actions based on determining an occurrence of a stop sign violation. For example, the violation detection platform 105 may provide an indication of the occurrence of the stop sign violation (e.g., an alert, an email message, cause a sound to be emitted by a vehicle device, and/or the like) to a user (e.g., a driver of the vehicle, a supervisor, and/or the like), provide an instruction to the vehicle to cause the vehicle to enter an autonomous driving mode, provide an instruction to the vehicle to cause the vehicle to perform a particular maneuver and/or action (e.g., stop, park, and/or the like), schedule driving training for a driver of the vehicle, utilize data associated with the occurrence of the stop sign violation to retrain the machine learning model, and/or the like.

In some implementations, the one or more actions performed by the violation detection platform 105 may be based on a type of the stop sign violation. For example, the violation detection platform 105 may perform one or more actions from a first group of actions (e.g., provide an indication of the occurrence of the stop sign violation and/or the like) when the stop sign violation is the first type of stop sign violation. The violation detection platform 105 may perform one or more actions from a second group of actions (e.g., schedule driving training for a driver of the vehicle and/or the like) when the stop sign violation is the second type of stop sign violation.

As described herein, the violation detection platform 105 analyzes image data, based on the time shift and/or the minimum speed data, and sensor data to automatically determine an occurrence of a traffic violation and may classify the violation. By automatically determining an occurrence of the traffic violation, the violation detection system allows an enterprise to reduce costs associated with vehicle accidents (e.g., a cost to repair a vehicle, a cost to replace a vehicle, a loss of revenue associated with the vehicle and/or a driver of the vehicle not being available for providing a good and/or service, and/or the like) by automatically identifying traffic violations thereby allowing training and/or another type of proactive action to be taken prior to the vehicle becoming involved in an accident.

As indicated above, FIGS. 1A-1I are provided as an example. Other examples can differ from what is described with regard to FIGS. 1A-1I.

Figure 2:
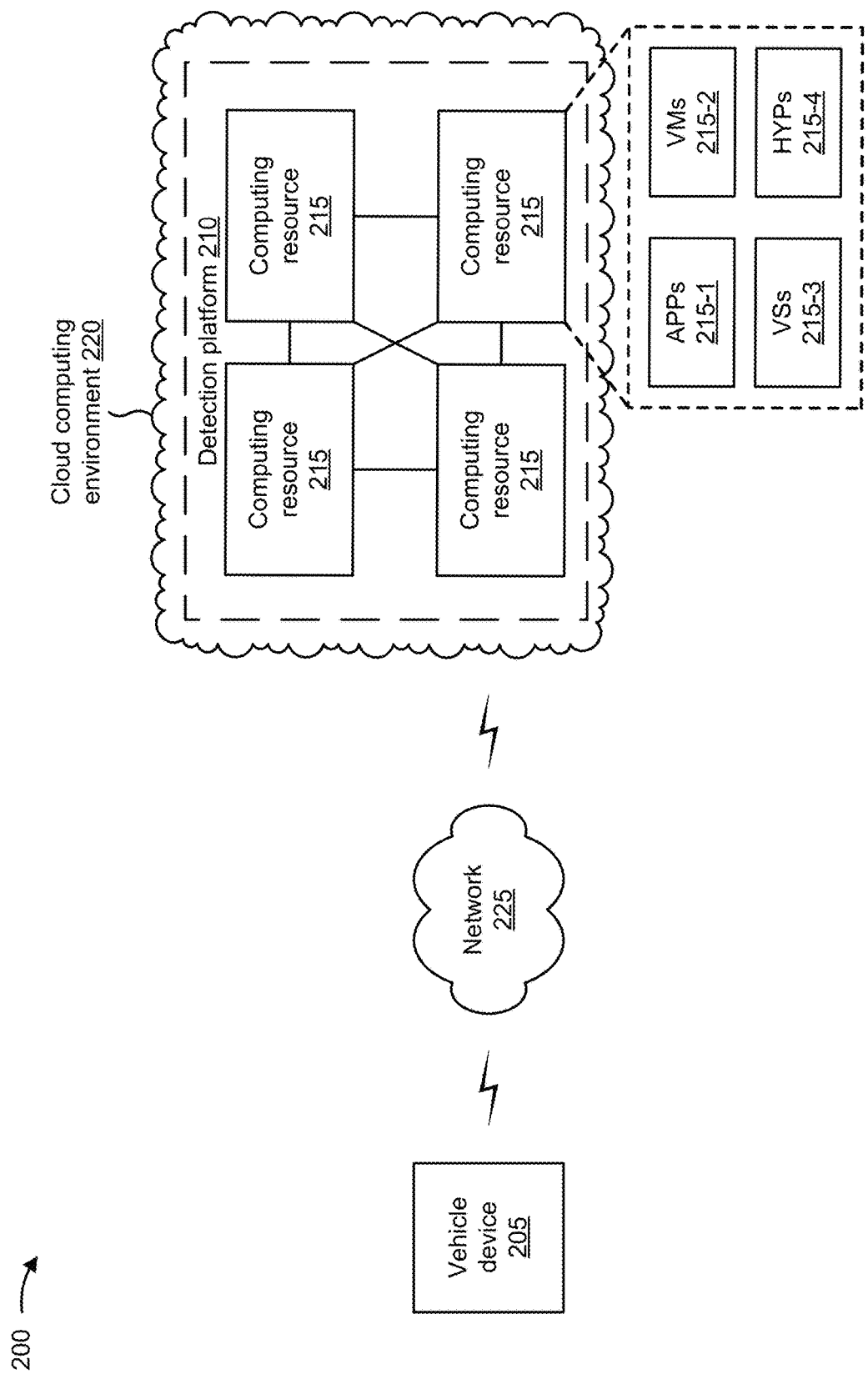
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include vehicle device 205, a violation detection platform 210 implemented within a cloud computing environment 220, and a network 225. Devices of environment 200 may interconnect via wired connections, wireless connections, or a combination of wired and wireless connections.

Vehicle device 205 includes one or more devices capable of receiving, generating, storing, processing, and/or providing information, such as information described herein. For example, vehicle device 205 may include a device included in vehicle 101 for obtaining data associated with the vehicle 101 traveling along a route such as an inertial measurement unit, a three-axis accelerometer, a gyroscope, a global positioning system (GPS) device, an OBD device, an ECU, a dash camera, a parking assist camera, a backup assist camera, and/or the like.

Violation detection platform 210 includes one or more computing resources assigned to support and/or automatically tune a virtual firewall. For example, violation detection platform 210 may be a platform implemented by cloud computing environment 220 that may automatically tune a virtual firewall. In some implementations, violation detection platform 210 is implemented by computing resources 215 of cloud computing environment 220.

Violation detection platform 210 may include a server device or a group of server devices. In some implementations, violation detection platform 210 may be hosted in cloud computing environment 220. Notably, while implementations described herein may describe violation detection platform 210 as being hosted in cloud computing environment 220, in some implementations, violation detection platform 210 may be non-cloud-based or may be partially cloud-based.

Cloud computing environment 220 includes an environment that delivers computing as a service, whereby shared resources, services, and/or the like may be provided to violation detection platform 210 and/or endpoint device 205. Cloud computing environment 220 may provide computation, software, data access, storage, and/or other services that do not require end-user knowledge of a physical location and configuration of a system and/or a device that delivers the services. As shown, cloud computing environment 220 may include violation detection platform 210 and computing resource 215.

Computing resource 215 includes one or more personal computers, workstation computers, server devices, or another type of computation and/or communication device. In some implementations, computing resource 215 may host violation detection platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by vehicle device 205. Application 215-1 may eliminate a need to install and execute the software applications on endpoint device 205. For example, application 215-1 may include software associated with violation detection platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS").

A process virtual machine may execute a single program and may support a single process. In some implementations, virtual machine 215-2 may execute on behalf of a user, and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the "guest operating systems" and may manage the execution of the guest operating systems. Multiple instances of a variety of operating systems may share virtualized hardware resources.

Network 225 includes one or more wired and/or wireless networks. For example, network 225 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
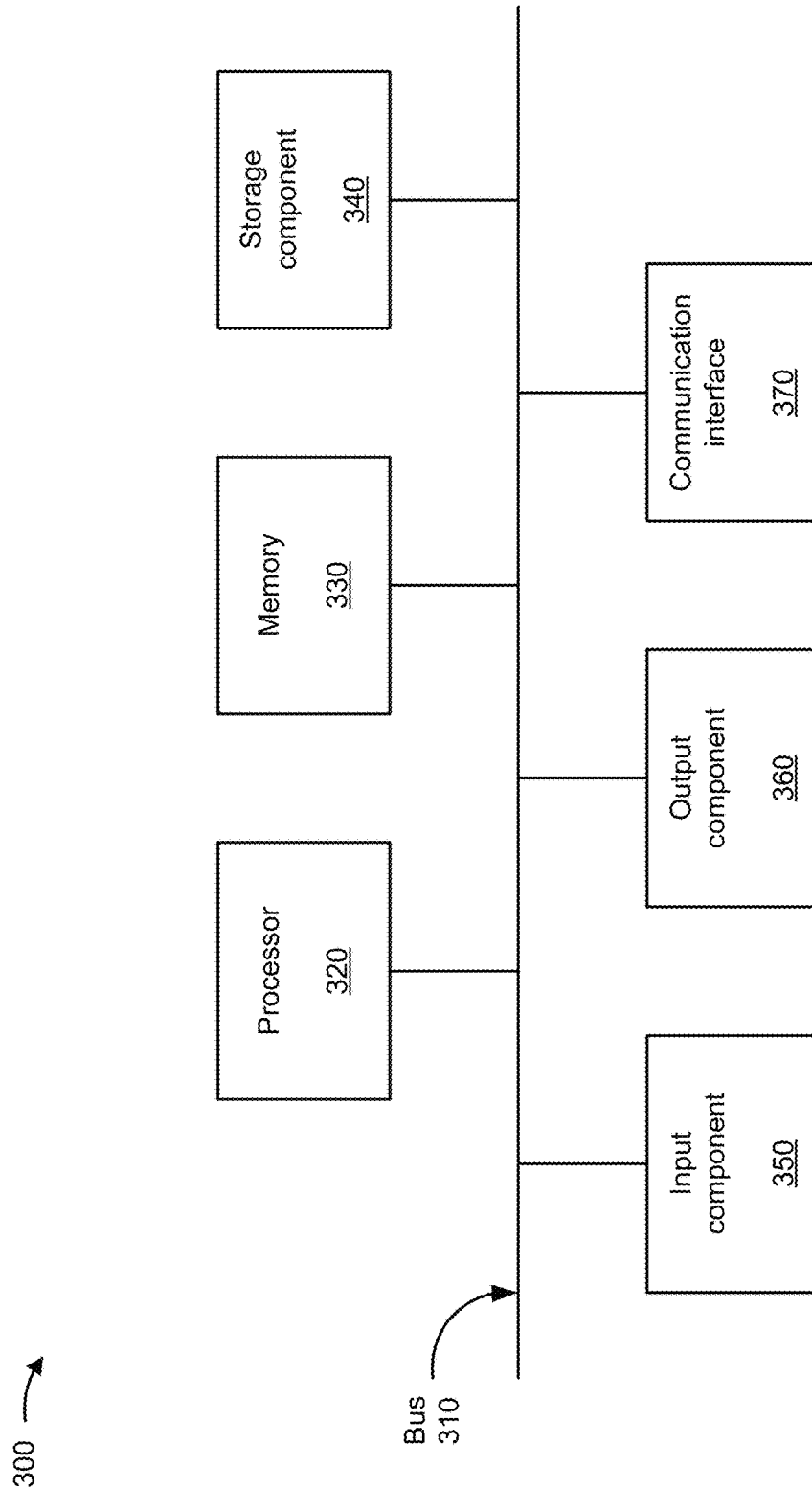
FIG. 3 is a diagram of example components of one or more devices of FIG. 2.

FIG. 3 is a diagram of example components of a device 300. Device 300 may correspond vehicle device 205, violation detection platform 210, and/or computing resource 215. In some implementations, vehicle device 205, violation detection platform 210, and/or computing resource 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining an occurrence of a stop sign violation. In some implementations, one or more process blocks of FIG. 4 may be performed by a device (e.g., violation detection platform 210 using processor 320, memory 330, storage component 340, input component 350, output component 360, communication interface 370, and/or the like). In some implementations, one or more process blocks of FIG. 4 may be performed by another device or a group of devices separate from or including the device, such as a vehicle device (e.g., vehicle device 205) and/or the like.

As shown in FIG. 4, process 400 may include obtaining image data, location data, and sensor data associated with a vehicle (block 410). For example, the device may obtain image data, location data, and sensor data associated with a vehicle, as described above.

The sensor data may include data obtained by an accelerometer associated with the vehicle or data obtained by a gyroscope associated with the vehicle.

As further shown in FIG. 4, process 400 may include determining a probability that a frame of the image data that includes an image of a stop sign is relevant to the vehicle (block 420). For example, the device may determine a probability that a frame of the image data that includes an image of a stop sign is relevant to the vehicle, as described above.

In some implementations, the device may utilize a machine learning method and heuristics to determine the probability that the frame that includes the image of the stop sign is relevant to the vehicle. The machine learning method may be a classifier machine learning method and/or a regression machine learning method such as a random forest classifier, a neural network, and/or the like. The heuristics may include a position of the stop sign in the frame of the image data.

In some implementations, the device may utilize a supervised machine learning model to determine the probability that the frame that includes the image of the stop sign is relevant to the vehicle. For example, the device may utilize a convolutional neural network to determine the probability that the frame that includes the image of the stop sign is relevant to the vehicle.

In some implementations, the device may determine the probability that each frame of the image data that includes the image of the stop sign is relevant to the vehicle and/or may compress and/or reduce a frame rate of the image data prior to determining the probability that the frame that includes the image of the stop sign is relevant to the vehicle.

As further shown in FIG. 4, process 400 may include determining that the probability satisfies a probability threshold (block 430). For example, the device may determine that the probability satisfies a probability threshold, as described above.

As further shown in FIG. 4, process 400 may include identifying location data and sensor data associated with the frame of the image data based on the probability satisfying the probability threshold (block 440). For example, the device may identify location data and sensor data associated with the frame of the image data based on the probability satisfying the probability threshold, as described above.

In some implementations, the device may align the location data and the sensor data with the image data and may identifying the location data and the sensor data based on the time-aligned location data, sensor data, and image data. For example, the device may determine a time delay associated with the location data and may align the location data with the sensor data and the image data based on the time delay.

As further shown in FIG. 4, process 400 may include determining an occurrence of a stop sign violation based on the probability, the location data, and the sensor data (block 450). For example, the device may determine an occurrence of a stop sign violation based on the probability, the location data, and the sensor data, as described above.

The device may utilize a machine learning model to determine the occurrence of the stop sign violation. For example, the device may utilize a random forest regressor machine learning model.

The device may determine a speed of the vehicle based on the location data and the sensor data associated with a set of frames. The device may determine whether the speed of the vehicle satisfies a threshold speed; and may selectively determine an occurrence of a first type of traffic violation or an occurrence of a second type of traffic violation based on whether the speed of the vehicle satisfies the threshold speed. The occurrence of the first type of traffic violation may be determined when the speed satisfies the threshold speed. The occurrence of the second type of traffic violation may be determined when the speed does not satisfy the threshold speed.

As further shown in FIG. 4, process 400 may include determining a type of the stop sign violation (block 460). For example, the device may determine a type of the stop sign violation, as discussed above.

As further shown in FIG. 4, process 400 may include performing one or more actions based on the type of the stop sign violation (block 470). For example, the device may perform one or more actions based on the type of the stop sign violation, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
obtaining, by a device, a plurality of frames of image data, location data, and sensor data associated with a vehicle;

determining, by the device and for each frame of the plurality of frames, a probability that each frame of the plurality of frames that includes an image of a stop sign is relevant to the vehicle;

determining, by the device, a longest sequence of consecutive frames of the plurality of frames for which the probability satisfies a probability threshold;

determining, by the device, a maximum probability associated with a frame included in the longest sequence of consecutive frames;

determining, by the device and based on the location data, a series of speeds of the vehicle;

determining, by the device, a time delay that, when applied to the location data, results in a maximum correlation between the series of speeds and the sensor data;

aligning the location data with the sensor data and the image data based on the time delay;

determining, by the device, a time window based on a time associated with the frame associated with the maximum probability;

identifying, by the device, a portion of the location data and a portion of the sensor data associated with the time window based on aligning the location data with the sensor data and the image data;

determining, by the device, an occurrence of a stop sign violation based on the probability, the portion of the location data, and the portion of the sensor data;

determining, by the device, a type of the stop sign violation; and performing, by the device, one or more actions based on the type of the stop sign violation.

2. The method of claim 1, wherein determining the longest sequence of consecutive frames for which the probability satisfies the probability threshold includes:

utilizing a machine learning method and heuristics to determine the probability that each frame of the plurality of frames that includes the image of the stop sign is relevant to the vehicle,
wherein the machine learning method includes a classifier machine learning method or a regression machine learning method, and
wherein the heuristics includes a position of the stop sign in each frame of the plurality of frames.

3. The method of claim 1, wherein determining the time delay comprises:

determining the time delay based on frequency information determined by computing a Fourier transform of the series of speeds based on the location data and the sensor data.

4. The method of claim 1, further comprising:

removing high-frequency noise from the sensor data,
wherein the time delay is determined based on removing the high-frequency noise.

5. The method of claim 1, wherein determining the longest sequence of consecutive frames for which the probability satisfies the probability threshold includes:

utilizing a supervised machine learning model to determine the probability that each frame of the plurality of frames that includes the image of the stop sign is relevant to the vehicle.

6. The method of claim 1, wherein determining the longest sequence of consecutive frames for which the probability satisfies the probability threshold includes:

utilizing a convolutional neural network to determine the probability that each frame of the plurality of frames that includes the image of the stop sign is relevant to the vehicle.

7. The method of claim 1, wherein a start of the time window corresponds to a starting time that is a first period of time prior to the time associated with the frame of image data associated with the maximum probability, and wherein an end of the time window corresponds to an ending time that is a second period of time after the time associated with the frame of image data associated with the maximum probability.

8. The method of claim 7, wherein the first period of time is different than the second period of time.

9. A system, comprising:

one or more processors configured to:
obtain a plurality of frames of image data, location data, and sensor data associated with a vehicle traveling from a first location to a second location;
identify a set of frames included in the plurality of frames that include an image of a traffic sign,
the set of frames comprising a longest sequence of consecutive frames for which a probability that each frame of the set of frames satisfies a probability threshold;
determine a maximum probability associated with a frame included in the set of frames:
determine, based on the location data, a series of speeds of the vehicle;
determine a time delay that, when applied to the location data, results in a maximum correlation between the series of speeds and the sensor data;
time-align the image data, the location data, and the sensor data based on the time delay;
determine a time window based on a time associated with the frame associated with the maximum probability;
obtain a portion of the location data and a portion of the sensor data associated with the time window based on time-aligning the image data, the location data, and the sensor data;
determine an occurrence of a traffic violation based on the portion of the location data and the portion of the sensor data associated with the time window;
determine a type of the traffic violation based on a correlation of the portion of the location data and the portion of the sensor data; and
perform one or more actions based on the type of the traffic violation.

10. The system of claim 9, wherein the one or more processors are further to:

determine a speed of the vehicle based on the portion of the location data and the portion of the sensor data associated with the time window; and
wherein the one or more processors, when determining the type of the traffic violation, are to:
determine whether the speed of the vehicle satisfies a threshold speed; and
selectively determine an occurrence of a first type of traffic violation or an occurrence of a second type of traffic violation based on whether the speed of the vehicle satisfies the threshold speed,
wherein the one or more processors determine the occurrence of the first type of traffic violation when the speed satisfies the threshold speed, and wherein the one or more processors determine the occurrence of the second type of traffic violation when the speed does not satisfy the threshold speed.

11. The system of claim 9, wherein the one or more processors, when determining the time delay, are to:
determine the time delay based on frequency information determined by computing a Fourier transform of the series of speeds based on the location data and the sensor data.

12. The system of claim 9, wherein the sensor data includes one or more of:
data obtained by an accelerometer associated with the vehicle, or
data obtained by a gyroscope associated with the vehicle.

13. The system of claim 9, wherein the one or more processors, when time-aligning the image data, the location data, and the sensor data, are to:
compress the image data; and
time-align the image data, the location data, and the sensor data based on compressing the image data.

14. The system of claim 9, wherein the one or more processors, when time-aligning the image data, the location data, and the sensor data, are to:
reduce a frame rate of the image data; and
time align the image data, the location data, and the sensor data based on reducing the frame rate of the image data.

15. The system of claim 9, wherein the one or more processors, when time-aligning the image data, the location data, and the sensor data, are to:
time-align the image data, the location data, and the sensor data based on a sample rate associated with the image data.

16. A non-transitory computer-readable medium storing instructions, the instructions comprising:
one or more instructions that, when executed by one or more processors, cause the one or more processors to:
obtain a plurality of frames of image data, location data, and sensor data associated with a vehicle traveling from a first location to a second location;
utilize a first machine learning model to identify a set of frames, of the plurality of frames, that include an image of a stop sign,
the set of frames comprising a longest sequence of consecutive frames for which a probability that each frame of the set of frames satisfies a probability threshold;
determine a maximum probability associated with a frame of the image data included in the set of frames;
determine, based on the location data, a series of speeds of the vehicle;
determine a time delay that, when applied to the location data, results in a maximum correlation between the series of speeds and the sensor data;
align the location data with the sensor data and the image data based on the time delay;
determine a time window based on a time associated with the frame of the image data associated with the maximum probability;
identify a portion of the location data associated with the time window and a portion of the sensor data associated with the time window based on aligning the location data with the sensor data and the image data;
utilize a second machine learning model to determine an occurrence of a stop sign violation associated with the vehicle traveling from the first location to the second location based on the time window, the portion of the location data associated with the time window, and the portion of the sensor data associated with the time window;
determine a type of the stop sign violation based on the portion of the location data associated with the time window and the portion of the sensor data associated with the time window; and
perform one or more actions based on the type of the stop sign violation.

17. The non-transitory computer-readable medium of claim 16, wherein the one or more instructions, when executed by the one or more processors, further cause the one or more processors to:
determine a speed of the vehicle associated with the stop sign violation based on the portion of the location data associated with the time window and the portion of the sensor data associated with the time window; and
classify the stop sign violation as a first type of violation or a second type of violation based on the speed of the vehicle associated with the stop sign violation,
wherein the one or more actions are performed based on classifying the stop sign violation as the first type of violation or the second type of violation.

18. The non-transitory computer-readable medium of claim 16, wherein the second machine learning model is a random forest regressor machine learning model.

19. The non-transitory computer-readable medium of claim 16, wherein the occurrence of the stop sign violation is determined as the vehicle travels to the second location.

20. The non-transitory computer-readable medium of claim 16, wherein the one or more instructions, that cause the one or more processors to perform the one or more actions, cause the one or more processors to one or more of:
output an alert indicating the occurrence of the stop sign violation;
provide an instruction to cause the vehicle to enter an autonomous driving mode;
cause the vehicle to perform a particular action;
schedule driver training for a driver of the vehicle; or
associate the set of frames with a tag indicating the occurrence of the stop sign violation.

* * * * *